United States Patent
Huang et al.

(10) Patent No.: US 7,941,055 B2
(45) Date of Patent: May 10, 2011

(54) METHOD FOR UPGRADING NETWORK RATE OF PASSIVE OPTICAL NETWORK

(75) Inventors: Wei Huang, Shenzhen (CN); Jun Zhao, Shenzhen (CN); Peilong Tan, Shenzhen (CN); Tao Jiang, Shenzhen (CN); Feng Wang, Shenzhen (CN); Jun Chen, Shenzhen (CN); Yuntao Wang, Shenzhen (CN); Huafeng Lin, Shenzhen (CN); Guo Wei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1093 days.

(21) Appl. No.: 11/595,842

(22) Filed: Nov. 9, 2006

(65) Prior Publication Data

US 2007/0171943 A1    Jul. 26, 2007

(30) Foreign Application Priority Data

Jan. 24, 2006  (CN) .......................... 2006 1 0002223

(51) Int. Cl.
*H04J 14/00* (2006.01)
*H04J 3/26* (2006.01)
*H04L 12/28* (2006.01)
*H01S 3/00* (2006.01)
*H04J 3/22* (2006.01)
*H04L 12/413* (2006.01)

(52) U.S. Cl. .............. 398/158; 398/72; 398/79; 398/67; 398/66; 359/344; 370/390; 370/453; 370/474; 370/401

(58) Field of Classification Search ................ 398/158, 398/154, 155, 140
See application file for complete search history.

(56) References Cited

U.S. PATENT DOCUMENTS

| | | | | |
|---|---|---|---|---|
| 5,157,651 | A * | 10/1992 | Ghelberg et al. ............. 370/233 |
| 5,321,541 | A * | 6/1994 | Cohen .............................. 398/82 |
| RE36,471 | E * | 12/1999 | Cohen .............................. 398/82 |
| 6,665,497 | B1 * | 12/2003 | Hamilton-Gahart et al. . 398/135 |
| 6,754,745 | B1 * | 6/2004 | Horvath et al. ................. 710/58 |
| 6,760,391 | B1 * | 7/2004 | Alb et al. ........................ 375/354 |
| 6,792,005 | B1 * | 9/2004 | Antosik et al. ................. 370/535 |
| 6,832,046 | B1 * | 12/2004 | Thomas .......................... 398/72 |
| 2002/0051455 | A1 * | 5/2002 | Lee et al. .................. 370/395.21 |
| 2002/0136232 | A1 * | 9/2002 | Dudziak et al. ............... 370/445 |
| 2002/0176157 | A1 * | 11/2002 | Dave et al. ..................... 359/344 |
| 2003/0039272 | A1 * | 2/2003 | Dudziak et al. ............... 370/503 |
| 2003/0091045 | A1 * | 5/2003 | Choi et al. ..................... 370/390 |
| 2003/0133460 | A1 * | 7/2003 | Lee et al. .................. 370/395.43 |
| 2003/0170032 | A1 * | 9/2003 | Song et al. .................... 398/168 |
| 2003/0219015 | A1 * | 11/2003 | Constant Six et al. ........ 370/389 |
| 2004/0033077 | A1 * | 2/2004 | Kim et al. ........................ 398/72 |
| 2004/0141759 | A1 * | 7/2004 | Stiscia et al. .................. 398/168 |
| 2004/0196869 | A1 * | 10/2004 | Tsuchida et al. .............. 370/468 |

(Continued)

*Primary Examiner* — Ken N Vanderpuye
*Assistant Examiner* — Oommen Jacob
(74) *Attorney, Agent, or Firm* — Conley Rose, P.C.; Grant Rodolph

(57) ABSTRACT

This invention provides a method for upgrading the network rate of a Passive Optical Network (PON), which mainly includes: upgrading the optical fiber line rate of the central office device, and adapting, by the network terminal device, the working rate of the upstream/downstream line automatically to the optical fiber line rate of the central office device according to a downstream data flow transmitted from the central office device. Using the method of this invention, the network rate of the PON can be upgraded without replacing the network terminal and without a manual intervention.

14 Claims, 3 Drawing Sheets

U.S. PATENT DOCUMENTS

| | | | |
|---|---|---|---|
| 2004/0213286 A1* | 10/2004 | Jette et al. | 370/466 |
| 2004/0218534 A1* | 11/2004 | Song et al. | 370/236.2 |
| 2004/0247316 A1* | 12/2004 | Soto et al. | 398/47 |
| 2006/0133809 A1* | 6/2006 | Chow et al. | 398/66 |
| 2006/0140642 A1* | 6/2006 | Brolin | 398/183 |
| 2006/0153222 A1* | 7/2006 | Van Caenegem et al. | 370/445 |
| 2006/0275036 A1* | 12/2006 | Hochbaum et al. | 398/67 |
| 2007/0003282 A1* | 1/2007 | Boyd et al. | 398/72 |
| 2007/0122152 A1* | 5/2007 | Matthews | 398/71 |
| 2007/0291777 A1* | 12/2007 | Jamieson et al. | 370/401 |

\* cited by examiner

METHOD FOR UPGRADING NETWORK RATE OF PASSIVE OPTICAL NETWORK

FIELD OF THE INVENTION

The present invention relates to the field of communication, and more particularly, to a method for upgrading the network rate of a Passive Optical Network (PON).

BACKGROUND OF THE INVENTION

An optical fiber has many advantages such as broad transmission frequency band, large capacity, low loss and good anti-interference performance, which is thus well suitable to be used as a transmission medium for high-speed and broadband services. Among various optical access technologies, Passive Optical Network (PON), as a promising optical access technology for nowadays and the future, has been receiving more and more attentions.

A PON is composed of a central office device, one or more optical splitters, a plurality of remote terminal devices and a plurality of optical fibers. The central office device is connected with an optical splitter through one optical fiber, forming a backbone line of the optical fiber. A splitter is connected with a number of remote terminal devices of the plurality of remote terminal devices through a corresponding number of optical fibers of the plurality of optical fibers.

Due to the continuous development of the optical access network, when the bandwidth of an original PON cannot meet the demand of users, it needs to upgrade the network rate of the original PON, for example, a Broadband Passive Optical Network (BPON) or a GPON (Gigabit Passive Optical Network).

At present, the optical network terminal of a user to be optically accessed is generally embedded in a wall or hung on an outer wall. A manual approach to upgrade the network terminal or replace the network terminal of the PON brings about many problems. It will not only affect the user's normal life, but also interrupt the normal communication traffic for the user, and the upgrade process is a great trouble. The manual approach for upgrading or replacing the network terminal also increases the network maintenance cost for the operator, and accordingly results in waste of the original network resources.

SUMMARY OF THE INVENTION

The present invention provides a method for upgrading the network rate of a PON.

According to an embodiment of the present invention, the method for upgrading the network rate of a PON includes:

upgrading the optical fiber line rate of the central office device, and adapting the working rates of the upstream and downstream lines of a network terminal device automatically to the optical fiber line rate of the central office device by the network terminal device according to the downstream data flow transmitted from the central office device.

According to an embodiment of the present invention, the method includes the steps of:

A. extracting, by a network terminal device, the clock for the downstream physical line rate of the central office device from the received downstream data flow transmitted from the central office device, and determining the working rate of the downstream line of the network terminal device according to the clock;

B. extracting, by the network terminal device, the information on the upstream line rate of the network terminal device specified by the central office device from the received downstream data flows transmitted from the central office device, and determining the working rate of the upstream line of the network terminal device according to the information.

According to an embodiment of the present invention, step A further includes:

extracting, by a clock recovery module in the network terminal device, the clock for the downstream physical line rate of the central office device from the downstream data flow received by a receiver in the network terminal device, synchronizing the system working clock of the network terminal device with the extracted clock, and making the working rate of the downstream line of the network terminal device coincident with the extracted clock.

According to an embodiment of the present invention, upgrading the optical fiber line rate of the central office device includes:

making, by the central office device, corresponding modifications to the parameters of the optical fiber line physical interface on the optical line terminal (OLT) of the central office device, according to the configuration command for modifying the parameters of the optical fiber line physical interface sent from the network management device of the Passive Optical Network (PON), so as to upgrade the rate of the optical fiber line thereof.

According to an embodiment of the present invention, step B further includes:

B1. carrying, by the central office device, the information on the specified upstream line rate of the network terminal device in a downstream information frame transmitted to the network terminal device;

B2. extracting the information on the specified upstream line rate by the network terminal device upon receiving the downstream information frame, and configuring the working rate of the upstream line thereof with the synchronized system working clock, making the working rate of the upstream line thereof coincident with the specified upstream line rate.

According to an embodiment of the present invention, step B1 further includes:

carrying, by the central office device, the information of the specified upstream line rate of the network terminal device in the Physical Layer Operation, Administration and Maintenance (PLOAM) information field of the frame header in the downstream information frame transmitted to the network terminal device.

According to an embodiment of the present invention, the PLOAM information field includes: network terminal identifier, information type identifier, information content and information check.

According to an embodiment of the present invention, in the PLOAM information field, the network terminal identifier occupies 1 byte, the information type identifier occupies 1 byte, the information content occupies 10 bytes and the information check occupies 1 byte, the bytes of the frame being transmitted in a sequence of network terminal identifier, information type identifier, information content and information check.

It can be seen from the above-mentioned technical solution according to embodiments of the present invention, compared with the prior art, the present invention has the following features.

1. The rate of a physical optical fiber line can be automatically adapted by the network terminal device without replacing the network terminal and without a manual intervention, such that automatic upgrade of the upstream and downstream line rates of the network terminal device can be realized, and accordingly the object of rate upgrade of the whole PON can be attained.

2. The complexity in rate upgrade of the PON is reduced and the inconvenience caused to the user by the rate upgrading process of the network terminal device is obviated, such that the network maintenance and upgrade of the network operator becomes more intelligent.

3. The network investment of the operator is saved, the investment cost for network upgrade of the operator is reduced and the lifetime of the operator's network is prolonged.

DETAILED DESCRIPTION OF THE PREFERRED EMBODIMENTS

The present invention provides a method for upgrading the network rate of a PON. The core of the present invention is: the optical fiber line rate of the central office device is upgraded firstly, and the network terminal can accommodate the variation in the optical fiber line rate, automatically adapting to the changed optical fiber line rate, so as to realize automatic upgrade of the rate of the network terminal device.

Figure 1:
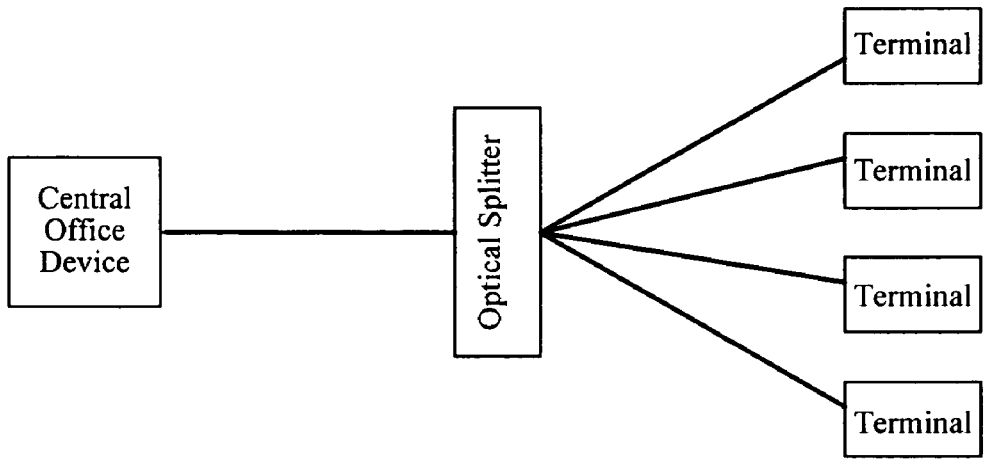
FIG. 1 is a schematic diagram illustrating the structure of a PON.
Figure 2:
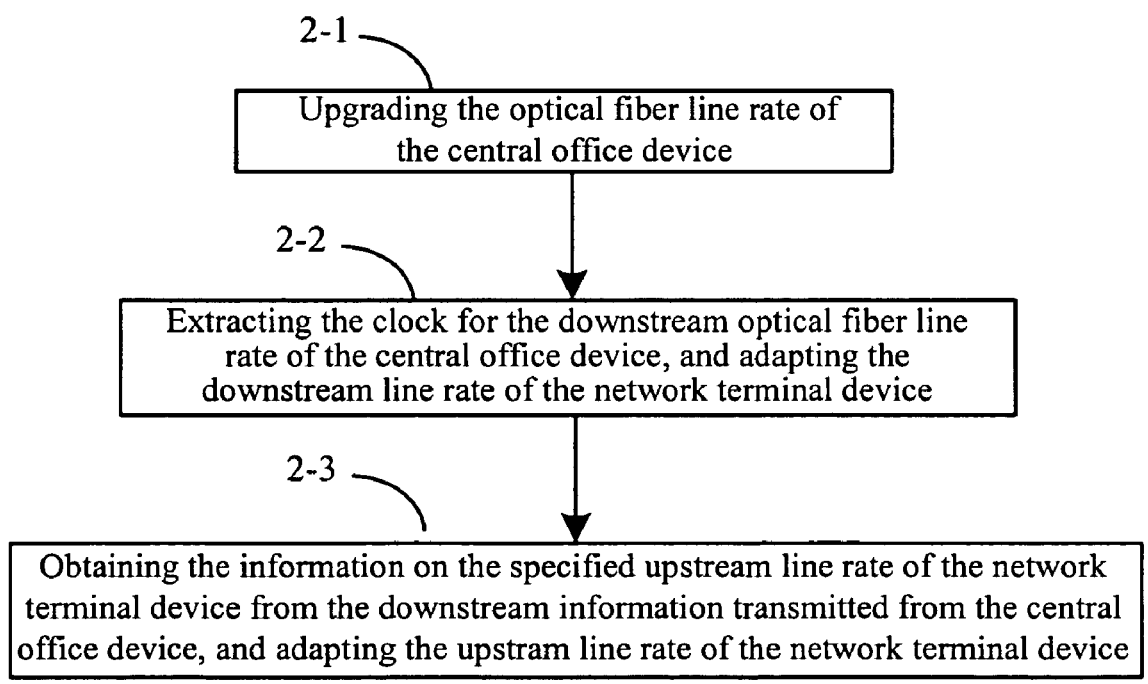
FIG. 2 illustrates a processing flow of an embodiment according to the method of the present invention.

Hereinafter the present invention will be described in detail with reference to the drawings. A processing flow of an embodiment according to the method of the present invention is shown in FIG. 2, which includes the steps of:

Step 2-1: upgrading the optical fiber line rate of the central office device.

The rate upgrade of a PON mainly includes the upgrade of the line rate of the physical optical fiber between the central office device and a network terminal device, and the upgrade of the upstream and downstream line rates of the network terminal device. For example, the upstream/downstream rate of the physical optical fiber between the central office device and the network terminal in a BPON may be upgraded from original 155 Mbps/622 Mbps to 622 Mbps/1.25 Gbps.

First, a configuration command for modifying the parameters of the optical fiber physical interface is sent to the central office device by the network management device of a PON. On receiving the configuration command, a control module in the central office device modifies the parameters of the optical fiber line physical interface on the optical line terminal (OLT) in the central office device and upgrades the upstream and/or downstream line rate of the optical fiber physical line of the central office device, for example, from 155 Mbps to 622 Mbps.

Figure 3:
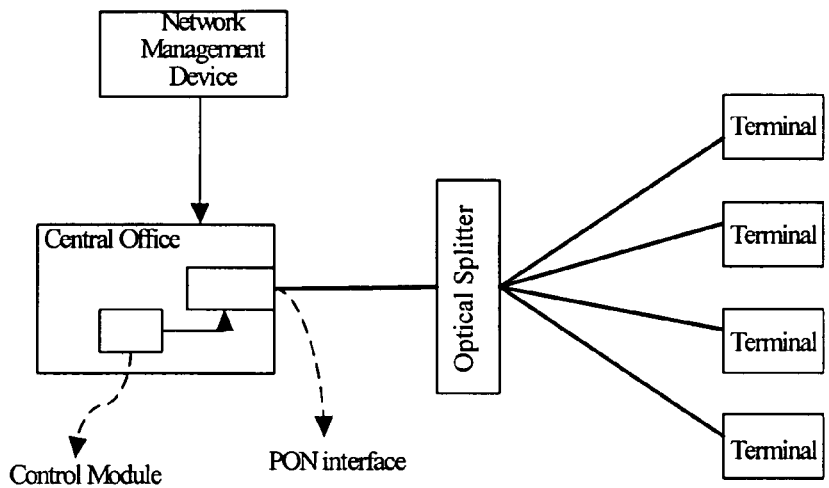
FIG. 3 is a schematic diagram illustrating upgrading the optical fiber line rate of the central office device by the network management device.

A schematic diagram illustrating upgrading the optical fiber line rate of the central office device by the network management device is shown in FIG. 3.

Step 2-2: extracting the clock for the downstream optical fiber line rate of the central office device, and adapting the downstream line rate of the network terminal device.

In a PON implementing the above-mentioned line rate upgrade, a clock recovery module in the network terminal device extracts the clock for the downstream physical line rate of the PON from the downstream data flow received by the receiver in the network terminal device. This clock is also the one for the downstream physical line rate of the central office device.

Then, the system working clock of the network terminal device is synchronized with the extracted downstream line clock. Also, the extracted downstream clock is used as the working clock of the downstream physical line of the network terminal device, so as to make the working rate of the downstream line of the network terminal device coincident with the extracted clock.

When the downstream physical line rate of the PON is changed, the clock of the downstream physical line rate extracted by the clock recovery module of the network terminal device will be changed accordingly. Thus, the downstream clock of the network terminal device can be made coincident with the downstream clock of the central office device, and automatic adaptation of the downstream line rate of the network terminal device is realized.

Figure 4:
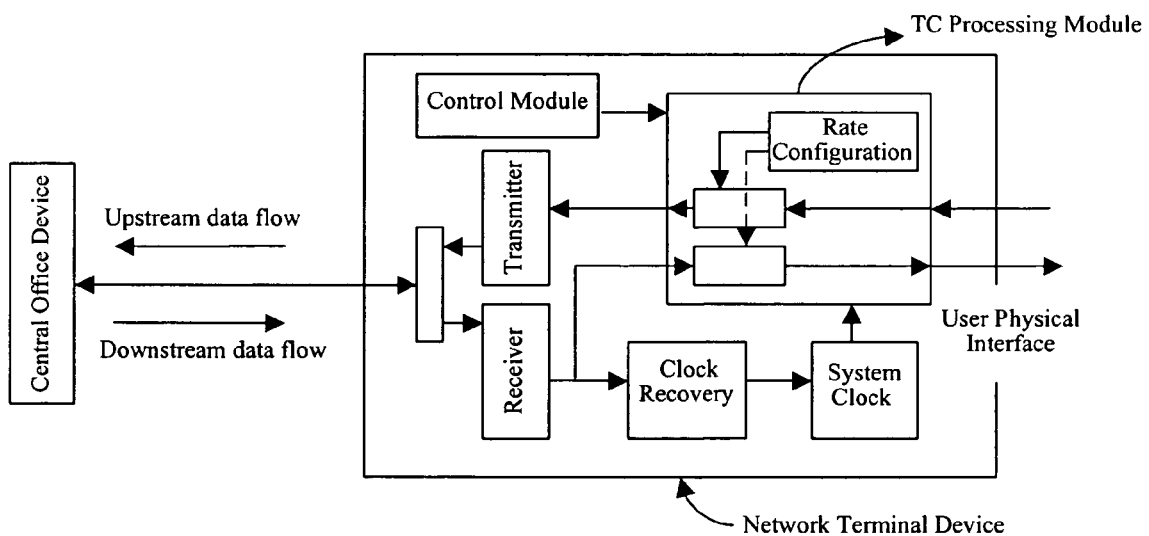
FIG. 4 is a schematic diagram illustrating adapting the downstream line rate of the network terminal device by extracting the clock of the downstream network line rate of the central office device.

A schematic diagram illustrating adapting the downstream line rate of the network terminal device by extracting the clock of the downstream network rate of the central office device is shown in FIG. 4.

Step 2-3: obtaining the information on the specified upstream line rate of the network terminal device from the downstream information transmitted from the central office device, and adapting the upstream line rate of the network terminal device.

After the downstream line rate of the network terminal device is adapted to the downstream physical line rate of the PON, the network terminal device can correctly receive a downstream information frame transmitted from the central office device. Thus, the central office device can carry the information on the specified working rate of the upstream physical line of the network terminal device in the downstream information frame.

Figure 5:
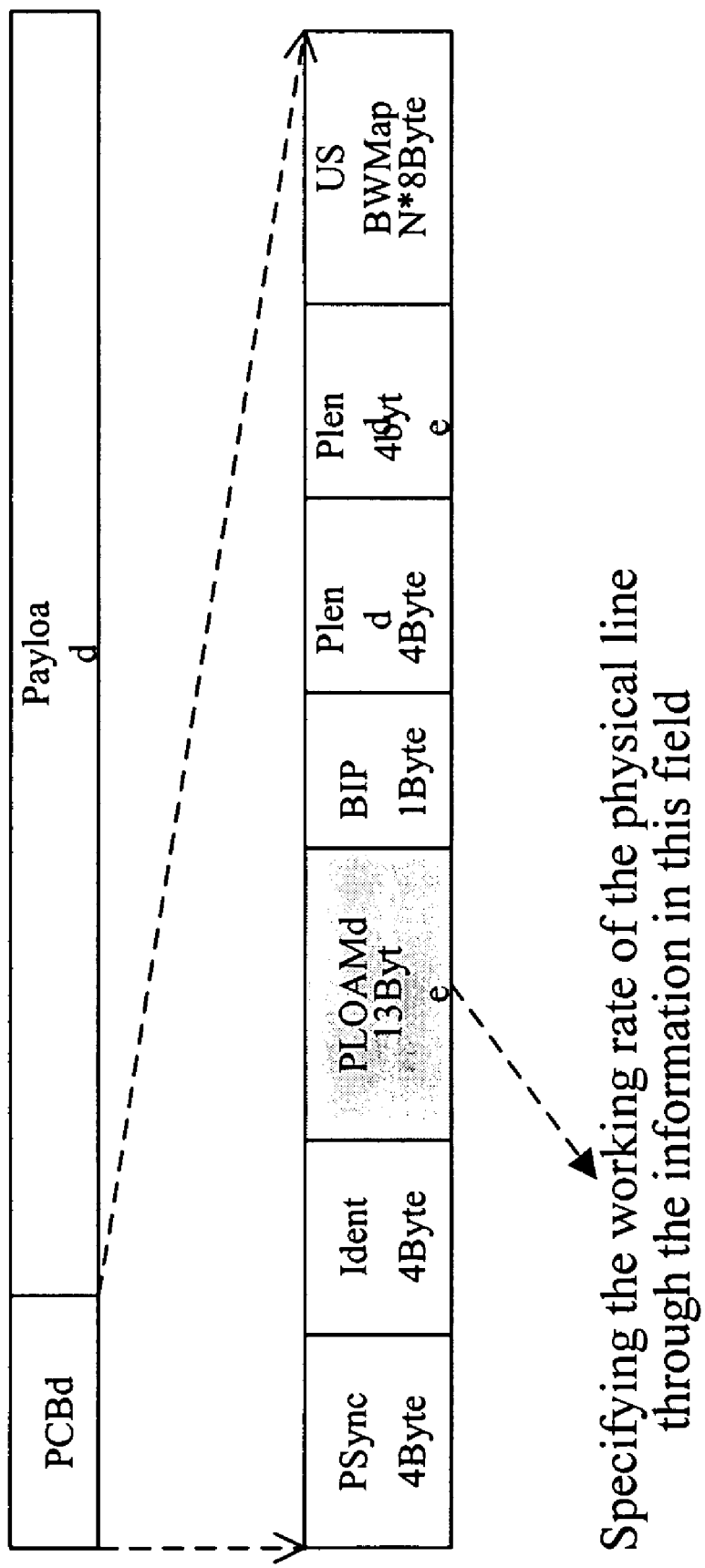
FIG. 5 is a schematic diagram illustrating the central office device carrying the information on the physical line working rate specified by the central office device in the frame header of a downstream information frame thereof.

For example, as shown in FIG. 5, the central office device carries the information on the upstream working rate of the network terminal device specified by the central office device in the Physical Layer Operation, Administration and Maintenance (PLOAM) information field in the frame header of a downstream information frame thereof. The format of the PLOAM information field is shown in table 1.

TABLE 1

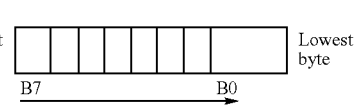

Each network terminal device extracts the carried information on the specified upstream working rate from the downstream information frame transmitted from the central office device, and respectively configures the upstream rate of the line interface thereof on the PON side with the synchronized system working clock, making the upstream working rate thereof coincident with the specified upstream line rate, and implements a change according to the line rate specified by the central office device. Moreover, the upstream line clock of the network terminal device, which is provided by the system clock of the network terminal device, is made synchronous with the downstream line clock thereof.

When all the upstream/downstream rates of the network terminal devices are adapted to the upstream/downstream rate of the physical optical fiber line of the PON, the network rate upgrade of the PON is realized.

Although the present invention has been described in terms of the preferred embodiments, those skilled in the art should understand these embodiments are not intended to limit the protection scope of the invention, and various changes and modifications can be made within the scope of the present invention, which is only defined by the appended claims and the equivalents thereof.

The invention claimed is:

1. A method for upgrading the network rate of a Passive Optical Network, comprising:
    varying an optical fiber line rate of a central office device;
    extracting, by a network terminal device, a clock for a downstream physical line rate of the central office device from a data within a received downstream data flow transmitted from the central office device;
    synchronizing a system working clock of the network terminal device with the extracted clock;
    carrying, by the central office device, an upstream information on an upstream line rate of the network terminal device specified by the central office device in a downstream information frame transmitted to the network terminal device; and
    extracting the information on the upstream line rate by the network terminal device upon receiving the downstream information frame, and determining a working rate of the upstream line of the network terminal device according to the upstream information, synchronizing a working rate of the upstream line with the system working clock of the network terminal device.

2. The method according to claim 1, wherein upgrading the optical fiber line rate of the central office device comprises:
    making, by the central office device, corresponding modifications to the parameters of the optical fiber line physical interface on the optical line terminal (OLT) of the central office device, according to the configuration command for modifying the parameters of the optical fiber line physical interface sent from the network management device of the Passive Optical Network (PON), so as to upgrade the rate of the optical fiber line thereof.

3. The method according to claim 1, wherein carrying the information comprises:
    carrying, by the central office device, the upstream information of the specified upstream line rate of the network terminal device in the Physical Layer Operation, Administration and Maintenance (PLOAM) information field of the frame header in the downstream information frame transmitted to the network terminal device.

4. The method according to claim 3, wherein the PLOAM information field comprises: network terminal identifier, information type identifier, information content and information check.

5. The method according to claim 4, wherein in the PLOAM information field, the network terminal identifier occupies 1 byte, the upstream information type identifier occupies 1 byte, the upstream information content occupies 10 bytes and the information check occupies 1 byte, the bytes of the frame being transmitted in a sequence of network terminal identifier, information type identifier, information content and information check.

6. A network terminal apparatus configured to implement a method, the method comprising:
    receiving a downstream data flow transmitted from a central office device, wherein the downstream data flow comprises a specified downstream information frame, and wherein the downstream information frame carries an information of an upstream line rate of the network terminal device;
    extracting a clock for a downstream physical line rate of the central office device from a data within the received downstream data flow;
    synchronizing a system working clock of the network terminal device with the extracted clock;
    extracting the information on the specified upstream line rate upon receiving the downstream information frame; and
    synchronizing the working rate of the upstream line with the synchronized system working clock.

7. The method of claim 1, wherein the data comprises a payload and a physical control block downstream (PCBd) field comprising a Physical Layer Operation Administration and Maintenance (PLOAM) field, wherein the PLOAM field comprises the clock for the downstream physical line rate of the central office device.

8. The method of claim 7, wherein the PLOAM field is 13 bytes long and further comprises a network terminal identifier field, an information type identifier field, an information content field, and an information check field.

9. The method of claim 8, wherein the PCBd field further comprises a primary synchronization (PSync) field, an Identification (Ident) field, a Bit-Interleaved Parity (BIP) field, a payload length indicator (Plen_d) field, and an upstream bandwidth map (US_BWMap).

10. The method of claim 9, wherein the PSync field is 4 bytes long, the Ident field is 4 bytes long, the BIP field is 1 byte long, the Plen_d field is 4 bytes long, and the US_BWMap is an integer multiple of 8 bytes long.

11. The network terminal apparatus of claim 6, wherein the downstream data flow further comprises a payload and a physical control block downstream (PCBd) field comprising a Physical Layer Operation Administration and Maintenance (PLOAM) field, wherein the PLOAM field comprises the clock for the downstream physical line rate of the central office device.

12. The network terminal apparatus of claim 11, wherein the PLOAM field is 13 bytes long and further comprises a network terminal identifier field, an information type identifier field, an information content field, and an information check field.

13. The network terminal apparatus of claim 12, wherein the PCBd field further comprises a physical synchronization (PSync) field, an Identification (Ident) field, a Bit-Interleaved Parity (BIP) field, a payload length indicator (Plen_d) field, and an upstream bandwidth map (US_BWMap).

14. The network terminal apparatus of claim 13, wherein the PSync field is 4 bytes long, the Ident field is 4 bytes long, the BIP field is 1 byte long, the Plen_d field is 4 bytes long, and the US_BWMap is an integer multiple of 8 bytes long.

* * * * *